Patented May 21, 1929.

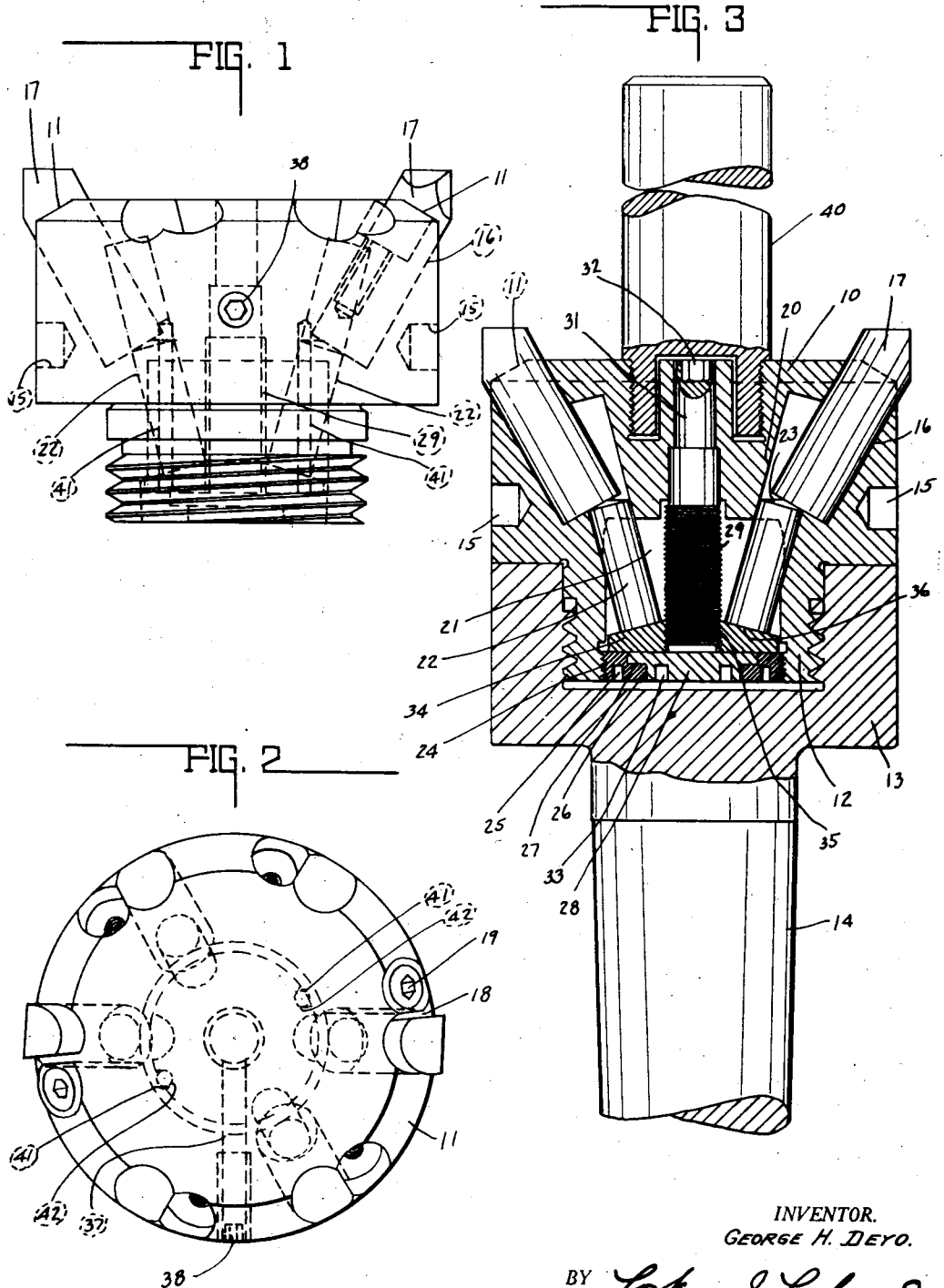

1,713,646

UNITED STATES PATENT OFFICE.

GEORGE H. DEYO, OF KOKOMO, INDIANA.

BORING HEAD.

Application filed September 4, 1926. Serial No. 133,710.

This invention relates to a cutter head.

The chief object of this invention is to provide a cutter head which is adapted to utilize a plurality of blades of the hardest cutting metal at present known, to wit, stellite, and or other cutting metals such as high speed steel, etc., and to adjust and mount the same in an improved manner.

The chief feature of the invention consists in the particular arrangement of the cutterhead and cutting blades supported thereby.

Another feature of the invention consists in the reversible adjustability of the blade adjusting mechanism.

Still a further feature of the invention consists in the arrangement of the cutter head whereby the same is universally adaptable and alignable.

The full nature of the invention will be understood from the accompanying drawings and the following description and claims:

In the drawings Fig. 1 is a perspective view of a simplified form of the cutter head including the cutter blades. Fig. 2 is a top plan view thereof. Fig. 3 is a central sectional view showing the same and mounted upon an adaptor and supporting an aligner.

In the drawings 10 indicates a base which herein is shown cylindrical and has a tapered forward edge 11 and an exteriorly threaded reduced axial extension 12, the same being receivable by any suitable machine, support, chuck or the like, or an adaptor 13 which may have a straight or tapered shank 14. The base 10 is provided with a suitable number of openings 15 for holding or threading said base on the desired support.

The base is provided with a plurality of peripherally arranged and spaced sockets 16, each of which is inclined to the base axis and rearwardly thereto, and terminates in the bevel face 11, thereby providing clearance for the cutters or blades 17, each of which has at least one flattened face 18, the socket being similarly provided with a corresponding flattened face and preventing blade turning. Mounted adjacent said socket and rigidly secured to the base and within the same is an anchoring clamp 19 for engaging the flat face 18 of the cutter 17 and clamping the cutter blade in the adjusted position. Herein the inclination of the socket 16 is somewhere in the neighborhood of 40 degrees. Communicating at its upper end with the lower end of the socket 16 is a similarly inclined channel 20 which at its opposite end communicates with a central chamber 21. The inclination of the channel 20 is about 20 degrees and mounted in each is a follower or cutter blade support 22 having a flattened but conical end 23 which bears against the transverse rear end of the cutter blades 17 and supports the same against longitudinal movement in the socket.

Chamber 21 adjacent its rear end is threaded as at 24 and threadedly mounted therein is a retaining plate 25 having a central aperture 26 and an enlargement 27 communicating with chamber 21. Mounted in said enlargement and having a portion extending through or at least exposed through the aperture 26 is a flanged plate 28 which is herein shown integral with a threaded stem 29 extending axially within chamber 21 and having a shouldered end 30 which is further reduced at 31. The base 10 is complementarily apertured to support the stem and its reduced extensions so that the end 31 is exposed on the top face of the cutter and said end is formed with a hexagonal socket 32 or equivalent device for tool reception. The opposite end of the threaded stem construction, towit, the flanged plate 28, is provided with suitable tool engageable portions in the form of spaced recesses 33.

With the foregoing construction therefore, either end of the stem 29 may be engaged by a tool and said stem rotated. The stem is prevented from moving axially in the chamber and recesses communicating therewith within the base 10 by the shouldered portions of said base and by the apertured collar or retainer 25.

Threadedly supported upon the stem 29 and within the chamber 21 is an adjusting plate 34 having the threaded portion 35 and the inclined face 36. Suitable means is provided which prevents rotation of plate 34, and herein said means comprises a drill rod 41 slidably associated with the diametrical recess 42 in plate 34, and thus rotation of stem 29 causes relative axial movement of said plate in the chamber for simultaneously raising or lowering of the followers 22 and thus simultaneous projection or retraction of all the cutter blades 17. The inclination of the bevelled face 36 is ninety degrees to the inclination of the several channels 20, so that full bearing is obtained and likewise the inclination of the bevelled face 23 of the followers 22 is ninety degrees to the inclination of the sockets 16. When the cutting tools have been adjusted for proper diameter by rotation of stem 29 from either end as aforesaid, the locking set screw 37 is tightened, the same having a headless tool engageable socket portion 28.

The head end of the cutter is herein shown provided with a suitable guide or liner 40 which is detachably mountable thereon whereby any desired guide can be substituted therefor and detachably associated with the head or none may be employed as desired.

The invention claimed is:

1. A cutter head comprising a base including a plurality of peripherally arranged sockets, each inclined towards each other and having a common axial intersection, a chamber axially arranged with respect to said sockets, a similar number of axially inclined interior channels, said last-mentioned channels having a common axial intersection in spaced relation to the first-mentioned intersection and each channel communicating at one end with one of the sockets, and at the other end with said chamber, a cutter blade engaging follower in each of said channels and receivable therein only through said chamber, said followers having one end exposable within said chamber, a centrally positioned threaded stem member positionable in said chamber, and a follower engaging plate member threadedly associated with the stem whereby relative rotation therebetween simultaneously moves each of the followers in said channels for simultaneously adjusting cutter blades in the sockets.

2. A device of the character defined by claim 1, characterized by the addition of means for engaging one of the cooperating threaded members for preventing rotation of the engaged member, whereby rotation of the other member secures longitudinal displacement of the followers, and locking means for maintaining the other and rotative member in non-rotative position when the followers are adjusted.

3. A device of the character defined by claim 1, characterized by the stem member being rotatable and having its opposite ends exposed by the base, each of said ends being fashioned for tool engagement whereby said stem can be rotated from either end for follower adjustment.

4. A device of the character defined by claim 1, characterized by the head of the base being fashioned for guide or aligner mounting.

5. A device of the character defined by claim 1, characterized by the rear of the base being fashioned for direct or adaptor mounting, and the head of the base being fashioned for guide or aligner mounting.

In witness whereof, I have hereunto affixed my signature.

GEORGE H. DEYO.